(12) United States Patent
Huang

(10) Patent No.: US 8,066,387 B2
(45) Date of Patent: Nov. 29, 2011

(54) LIGHT SOURCE MODULE AND DISPLAY SYSTEM COMPRISING THE LIGHT SOURCE MODULE

(75) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 480 days.

(21) Appl. No.: 11/971,945

(22) Filed: Jan. 10, 2008

(65) Prior Publication Data

US 2008/0316565 A1    Dec. 25, 2008

(30) Foreign Application Priority Data

Jun. 20, 2007  (TW) .............................. 96122039 A

(51) Int. Cl.
G03B 21/20 (2006.01)
(52) U.S. Cl. .......................................... 353/85; 353/20
(58) Field of Classification Search .................... 353/31, 353/94, 85; 348/742
See application file for complete search history.

(56) References Cited

U.S. PATENT DOCUMENTS

| | | | |
|---|---|---|---|
| 4,699,483 A * | 10/1987 | Swinehart | ..................... 352/216 |
| 2005/0190562 A1 | 9/2005 | Keuper et al. | |
| 2005/0213051 A1 | 9/2005 | Smet | |
| 2006/0164607 A1 | 7/2006 | Morejon et al. | |
| 2006/0238717 A1 * | 10/2006 | Maximus et al. | ............... 353/30 |
| 2007/0121085 A1 | 5/2007 | Dewald | |

FOREIGN PATENT DOCUMENTS

JP    2007-41567    2/2007

OTHER PUBLICATIONS

Chinese Office Action dated Jun. 5, 2009 from related Chinese Application No. 2007101094720 and English translation thereof.
Murat et al, Increased lumens per etendue by combining pulsed light-emitting diodes, Optical Engineering, Mar. 2006, 8 pages, vol. 45(3).

* cited by examiner

Primary Examiner — Que T Le
Assistant Examiner — Jerry Brooks
(74) Attorney, Agent, or Firm — Grossman, Tucker, Perreault & Pfleger, PLLC

(57) ABSTRACT

A light source module and a display system comprising the light source module are provided. The light source system comprises a first light source module and a second light source module. The first light source module provides a light beam of a first color, and the second light source module provides a plurality of light beams, having colors different from the first color light beam. The light source system turns on the light beam of first color and the light beams with different colors according to a predetermined integrated timing, and transmits them to the light guiding system. The light guiding system guides the light beams provided by the light source system to the imaging system for imaging. The first light source module further comprises two light beams with the same color and switches in turn to function as one light beam. The switching is realized by using the mirror wheel.

13 Claims, 8 Drawing Sheets

LIGHT SOURCE MODULE AND DISPLAY SYSTEM COMPRISING THE LIGHT SOURCE MODULE

This application claims priority to Taiwan Patent Application No. 096122039 filed on Jun. 20, 2007, the disclosures of which are incorporated herein by reference in their entirety.

BACKGROUND OF THE INVENTION

1. Field of the Invention

The present invention relates to a light source device; more particularly, the present invention relates to a module that employs a plurality of light emitting diodes (LEDs) as a light source, and a display system comprising the light source module.

2. Descriptions of the Related Art

A light emitting construction employing LEDs as a light source is disclosed in U.S. patent application Ser. No. 11/081,825. The light emitting construction emits a light beam with a high driving current in a non-continuous lighting state. This construction forms a basis for a light source module and a projection system comprising the light source module.

A light source module 1 as seen in FIG. 1 comprises a first LED 111, a second LED 112, a mirror wheel 12, and a power control device (not shown). The two LEDs 111, 112, with the mirror wheel 12 being disposed therebetween, are disposed such that their light emitting paths are substantially orthogonal to each other.

The mirror wheel 12 rotating about its axis 123 comprises a plurality of alternately disposed reflective sectors 121 and transparent sectors 122. Through a microscopic breakdown analysis of its operation mode, it can be shown that when the power control device supplies a current to the first LED 111 in order to make it emit light, one transparent sector 122 of the mirror wheel 12 will be synchronously rotated to a position corresponding to a direction in which the first LED 111 emits light, so that the light beam can pass through and exit toward an output direction. Subsequently, when the power control device supplies a current to the second LED 112 instead and switches off the current to the first LED 111, one reflection sector 121 of the mirror wheel 12 will be rotated to a position corresponding to the direction in which the second LED 112 emits light, so that the light beam from the second LED 112 is reflected and propagated toward the same output direction. In this way, the light source as a whole can provide the desired light rays in a fast alternating manner, effectively resulting in continuous light as perceived by the human eye.

FIG. 2 is a schematic graph depicting an alternating emission duty cycle of the aforesaid light emitting structure. More specifically, the alternating emission of the two LEDs will result in an on-state light flux (i.e., the "flat peak section" labeled by symbol A) in the output light source. This setup is adapted to implement a nearly continuous light flux along the time axis as a replacement for the continuous operation mode associated with a single LED, and provides a higher luminance.

However, such an ideal structure still has a defect in practical operation. That is, since reflective sectors 121 and transparent sectors 122 of the mirror wheel 12 are alternately disposed, a number of border regions between the reflective sectors and transparent sectors will be inevitably formed therebetween. In the case that a light beam from either LED impinges entirely or partly on such border regions, not only will a portion of the light beam be lost, but also the instantaneous flux will be degraded.

To avoid the aforesaid light loss, the LEDs must be controlled so that light beam will not be emitted on the border regions. However, since the two LEDs have their positions fixed, the only solution for this setup is to switch off an operating LED in advance when a border region of the mirror wheel 12 is approaching a light beam, after which the opposite LED will be switched on immediately. In other words, the border regions should be accompanied by an off-state (i.e., the "narrow trough section" labeled by symbol B), and only after the border region pass through the LED, can the opposite LED be allowed to emit a light beam.

However, as is well known, a LED is a light source that provides a highly diffusive light beam, rather than an ellipsoidal lamp of collective nature or a parabolic lamp that provides a parallel light beam. As a result, the light beam projected by a LED will actually occupy a substantial area on the mirror wheel 12, and the aforesaid solution of switching on and off for LEDs in advance is impractical to achieve the desired effect. Moreover, using this method to skip the border regions, the numerous borders regions on the mirror wheel 12 will cause a substantial area on the mirror wheel 12 that is unusable at the very onset, which will not only shorten the desirable A sections ("flat peak sections") and lengthen the undesirable B sections ("narrow trough sections") in the otherwise continuous light flux, but also exacerbate the discontinuity in the light flux and substantially degrade the efficiency the mirror wheel 12.

In view of this, there exists an urgent need in the art to provide a light source module that partly or completely obviates such disadvantages, and a display system comprising the light source module.

SUMMARY OF THE INVENTION

One objective of this invention is to provide a light source module featuring higher luminescent efficiency, sufficient light flux, and sustained continuity as seen by the human eye, and to provide a display device comprising the same.

To this end, a light source module of this invention comprises a mirror wheel and at least two light source submodules. The mirror wheel includes a central rotating shaft and a body. The body is disposed at an outer edge of the central rotating shaft, and comprises an inner portion and an outer portion formed at an outer edge of the inner portion. The outer portion comprises at least one reflective segment and at least one transparent segment, which are alternately arranged along the outer edge of the inner portion. The at least two light source submodules are disposed at opposite sides of the mirror wheel, each comprising a light emitting diode (LED) and at least one light collecting element. The at least one light collecting element is adapted to converge the light beam projected from the LED to the reflective segment or the transparent segment.

A display system of this invention comprises a light source system, a light guiding system and an imaging system. The light source system comprises a first light source module and a second light source module, and is configured to provide light beams used for imaging. The light guiding system is adapted to guide the light beams generated by the light source system to the imaging system so as to be imaged by the imaging system. The first light source module comprises the aforesaid light source module and is configured to provide a first-color light beam, while the second light source module is configured to provide light beams having a plurality of colors different from the first color light beam. The first color light beam and the plurality of color light beams with different colors are lit and entering the light guiding system according to the predetermined integrated timing.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
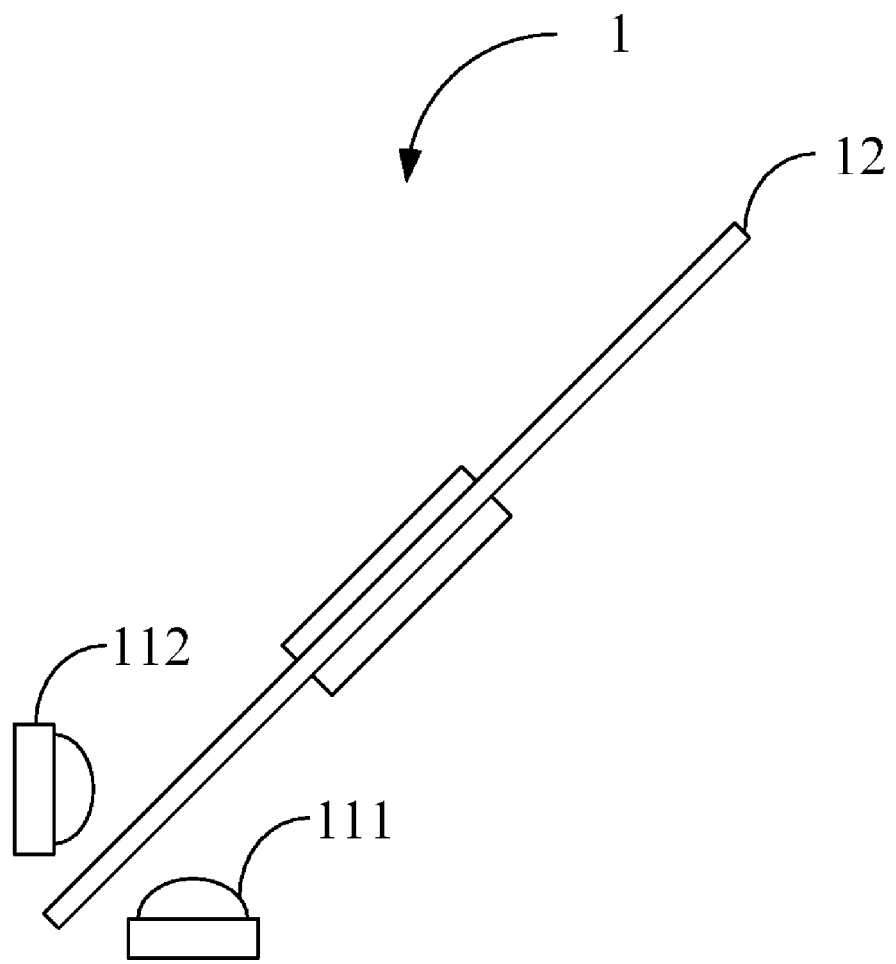
FIG. 1A is a schematic view of an arrangement between a mirror wheel and a light source in the prior art.
Figure 1B:
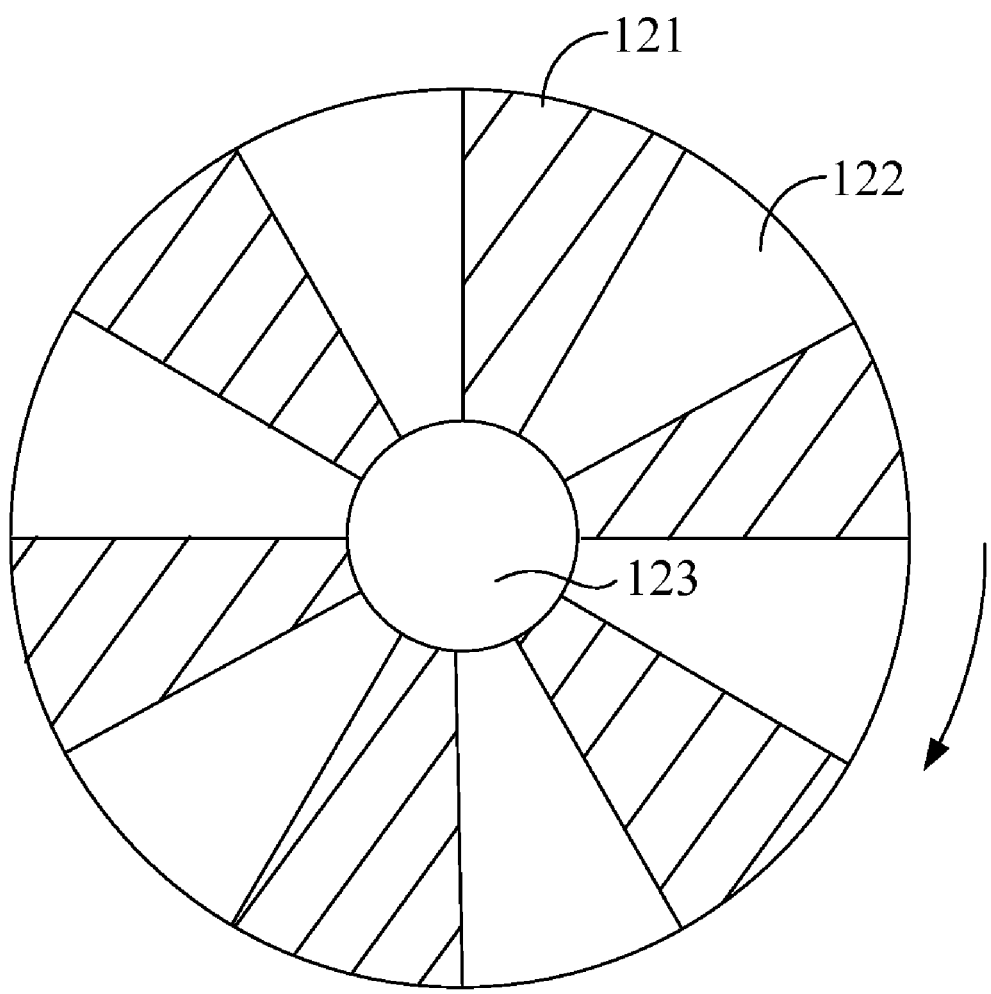
FIG. 1B is a schematic plan view of the mirror wheel of FIG. 1A.
Figure 2:
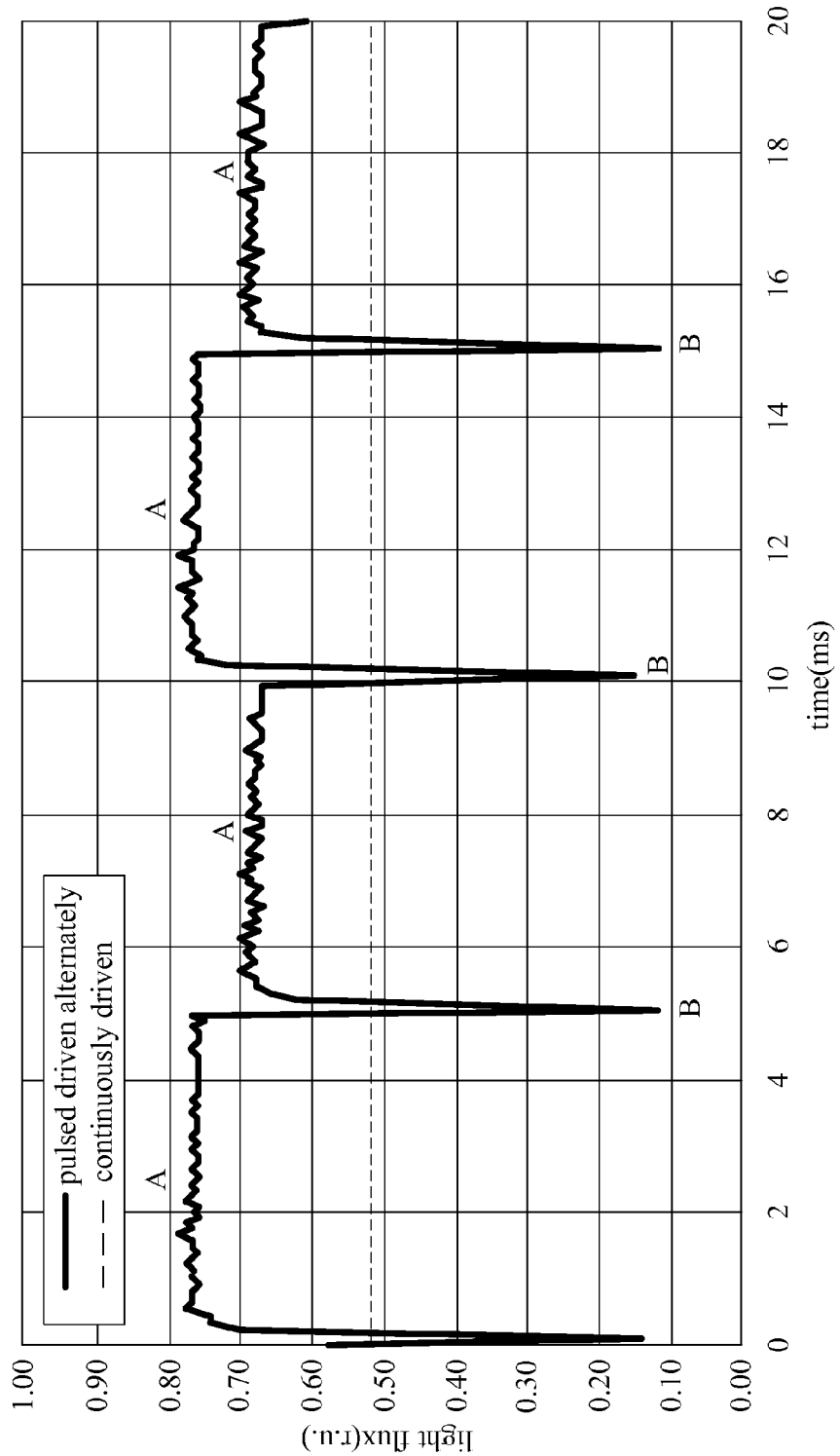
FIG. 2 is a graph showing the light flux-time relationship in the alternating emission duty cycle structure shown in FIG. 1A.
Figure 3A:
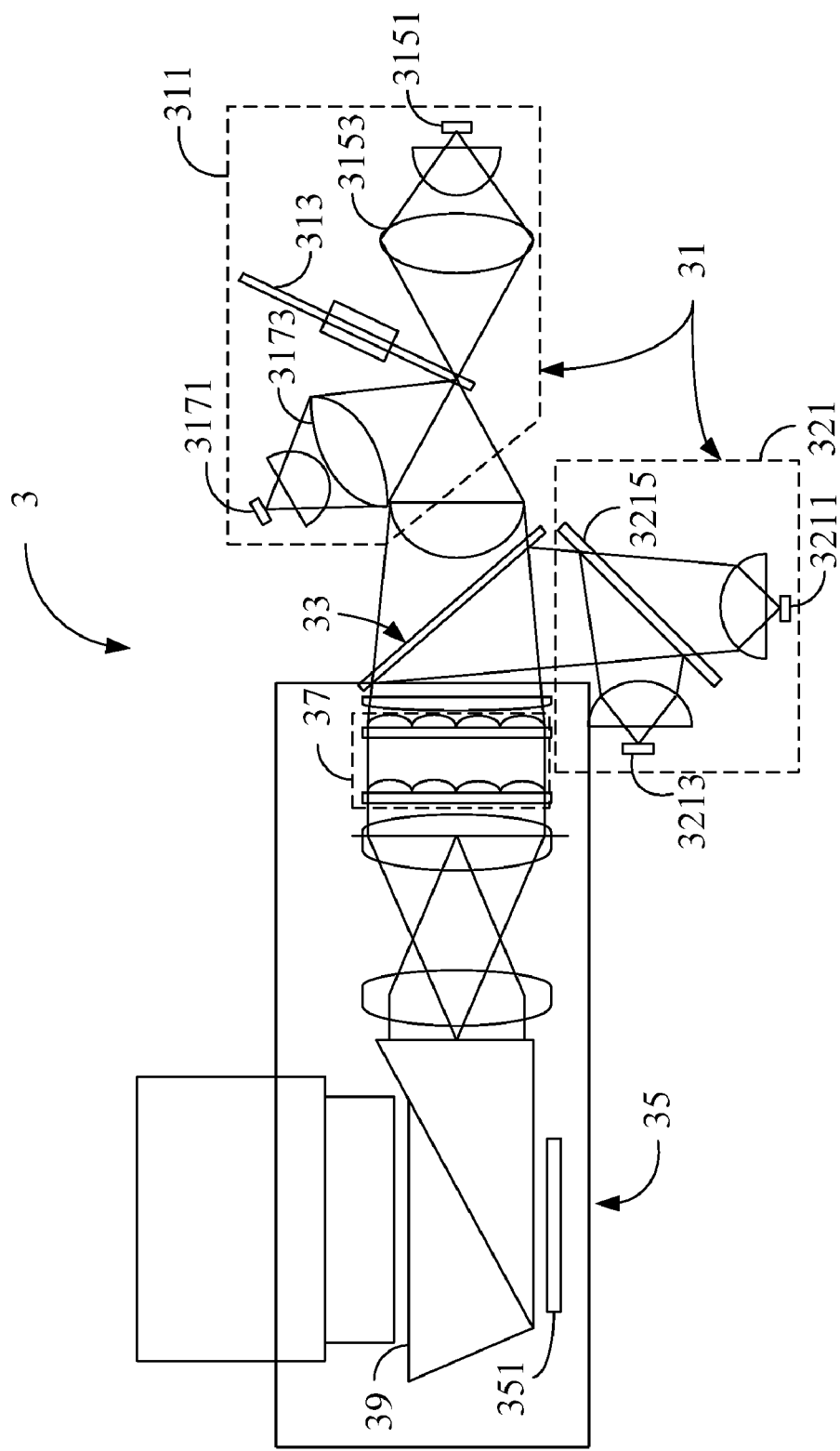
FIG. 3A is a schematic view of a display system in accordance with a first embodiment of this invention.

A display system 3 in accordance with a first embodiment of this invention is depicted in FIG. 3A. The display system 3, which in this embodiment is a digital light processing (DLP) projector, comprises a light source system 31, a light guiding system 33, and an imaging system 35.

The light source system 31, comprising a first light source module 311 and a second light source module 321, is configured to provide a light beam needed for imaging. The first light source module 311 comprises a mirror wheel 313, two submodules, and a controller (not shown).

Figure 5:
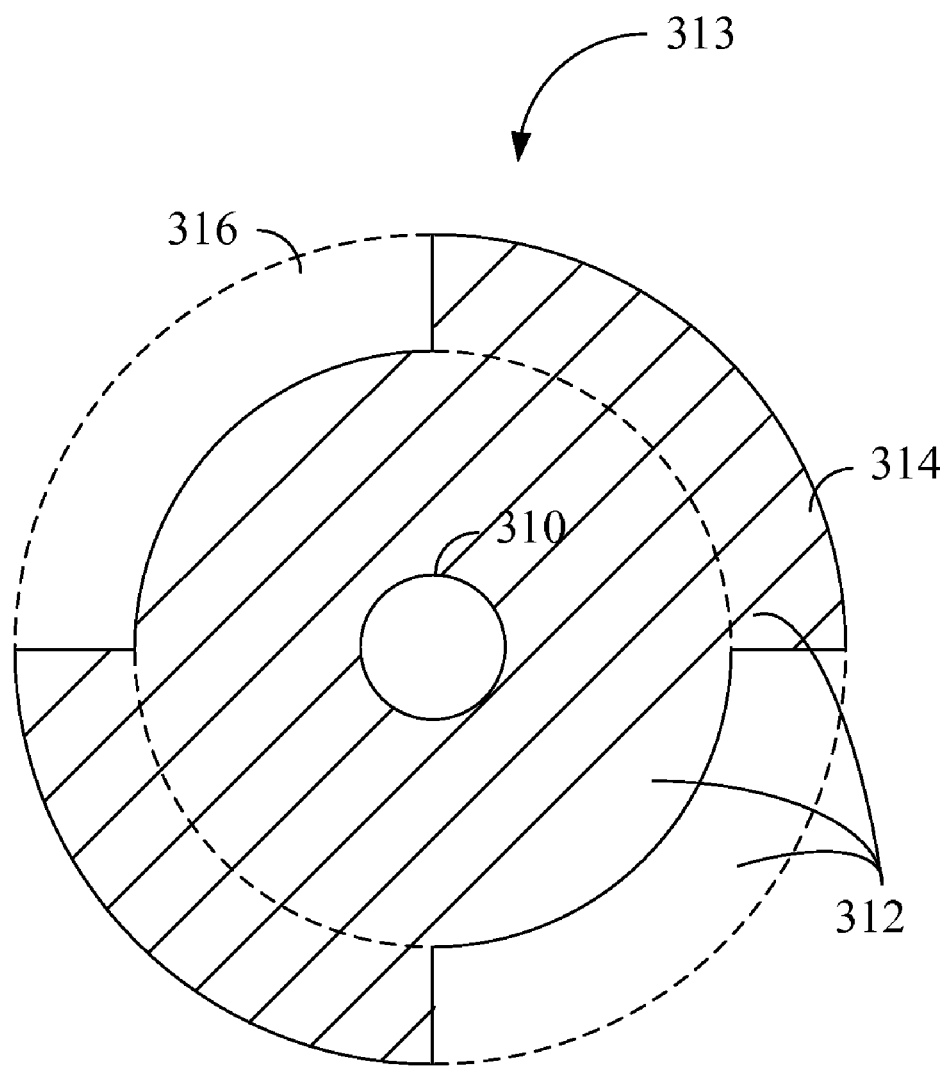
FIG. 5 is a schematic view of a mirror wheel in accordance with the first embodiment of this invention.

Referring to FIG. 5, the mirror wheel 313 has a central rotating shaft 310 and a body 312 with, in this embodiment, a disc shape. For reference, the body 312 may be a disc of 5 cm in diameter (the diameter can be adjusted depending on actual requirement). The body 312 is disposed at an outer edge of the central rotating shaft, and comprises an inner portion and an outer portion formed at an outer edge of the inner portion. The outer portion has a plurality of reflective segments 314 and a plurality of transparent segments 316, with these reflective segments 314 and transparent segments 316 alternately arranged along the outer edge of the inner portion. The reflective segments 314 shown in the figure are spaced apart with one another along the outer edge of the inner portion, so as to form a hollowing segment between two adjacent reflective segments 314 that is adapted to define each of the transparent segments 316. In this embodiment, there are two reflective segments 314 and two transparent segments 316 as shown in FIG. 5, although implementations with only one or more than one reflective segments 314 and transparent segments 316 may occur to those skilled in this field.

The first light source submodule and the second light source submodule are disposed symmetrically with respect to the mirror wheel 313. The first light source submodule includes a first LED 3151 and a first light collecting element 3153 that is adapted to converge the light beam that is emitted from the first LED 3151 for projecting to the reflective segments 314 according to a first timing ($G_1$). The second light source submodule includes a second LED 3171 and a second light collecting element 3173 that is adapted to converge the light beam that is emitted from the second LED 3171 for projecting to the transparent segments 316 according to a second timing ($G_2$). In this embodiment, the light collective elements may be lenses, while the first LED 3151 and the second LED 3171 are both green LEDs.

A controller (not shown) is electrically connected to the two light source submodules for controlling the input voltages of the first timing ($G_1$) and the second timing ($G_2$). In this embodiment, the first timing ($G_1$) and the second timing ($G_2$) are indicated that the controller provides input voltages in an alternating pulse format.

Figure 3B:
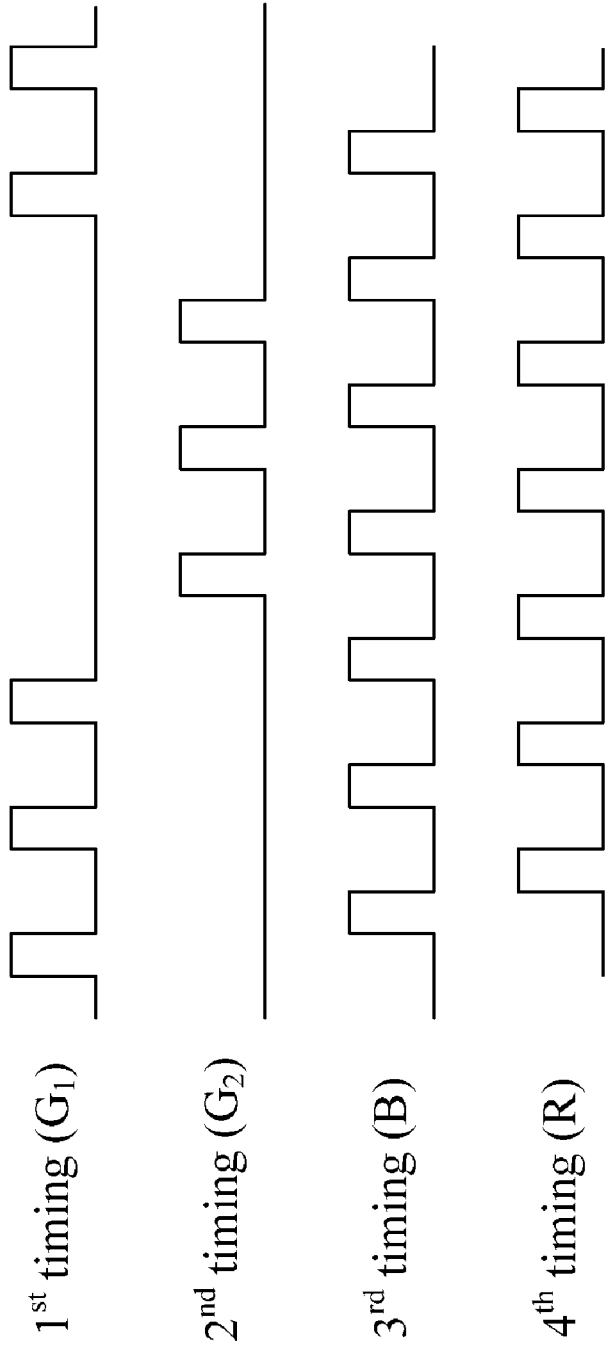
FIG. 3B is an emission timing diagram for the structure of FIG. 3A.

It can be seen from the timing diagrams of FIG. 3B that the first LED 3151 and the second LED 3171 are configured to emit light beams at different times. After being reflected from the reflective segments 314 or transmitted through the transparent segments 316, the light beams emitted from the two LEDs follow an overlapped path for providing a light beam of a first color to the light guiding system 33, wherein the first color is green. The alternate disposition of the reflective segments 314 and the transparent segments 316 is adopted to correspond with the switching between the first light source submodule and the second light source submodule. The three pulses of the first timing ($G_1$) correspond to the light beams emitted from the first LED 3151 projecting onto the reflective segments 314 of the mirror wheel 313, while the three pulses of the second timing ($G_2$) correspond to the light beams emitted from the second LED 3171 projecting onto the transparent segments 316 of the mirror wheel 313. Here, an extremely high switching speed could be reached by LEDs, which depends on the number of transparent segments 316 and reflective segments 314 as well as the rotation speed of the mirror wheel 313.

The second light source module 321 is configured to provide light beams of a plurality of colors which is different from the first color, with the number of colors used in this case, but not limited to, two. The second light source module 321 comprises a third LED 3211, a fourth LED 3213, and a light coupling element 3215, wherein the light coupling element 3215 is adapted to direct light beams emitted from the third LED 3211 and the fourth LED 3213 to the light guiding system 33. In this embodiment, the third LED 3211 is configured to emit a blue light beam according to a third timing (B), and the fourth LED 3213 is configured to emit a red light beam according to a fourth timing (R).

In accordance with a predetermined integrated timing comprising a first, a second, a third, and a fourth timings, as shown in FIG. 3B, these LEDs in the first light source module 311 and the second light source module 321 emit light beams of the first color (green) and the plurality of different colors (blue and red) and project them into the light guiding system 33.

In this embodiment, the light guiding system 33 is a light coupling mirror for combining the light beams of colors from two directions into the same direction, which is adapted to guide the light beams of the first color emitted from the first light source module 311 directly to the imaging system 35, and guide the light beams of the plurality of colors emitted from the second light source module 321 also to the imaging system 35. Additionally, the light coupling mirror and the aforesaid light coupling element 3215 of the second light source module 321 may also be an X-plate, a dichroic mirror, a prism, or a color filter.

In this embodiment, the imaging system 35 comprises a lens array assembly 37, a digital micromirror device (DMD)

351 and a prism 39. Hence, the light beams of the first color and the plurality of colors guided by the light guiding system 33 are then processed by the lens array assembly 37 into light beams of uniform luminance. They are then imaged by the DMD 351 before being finally projected via the prism 39 onto a screen.

Figure 4A:
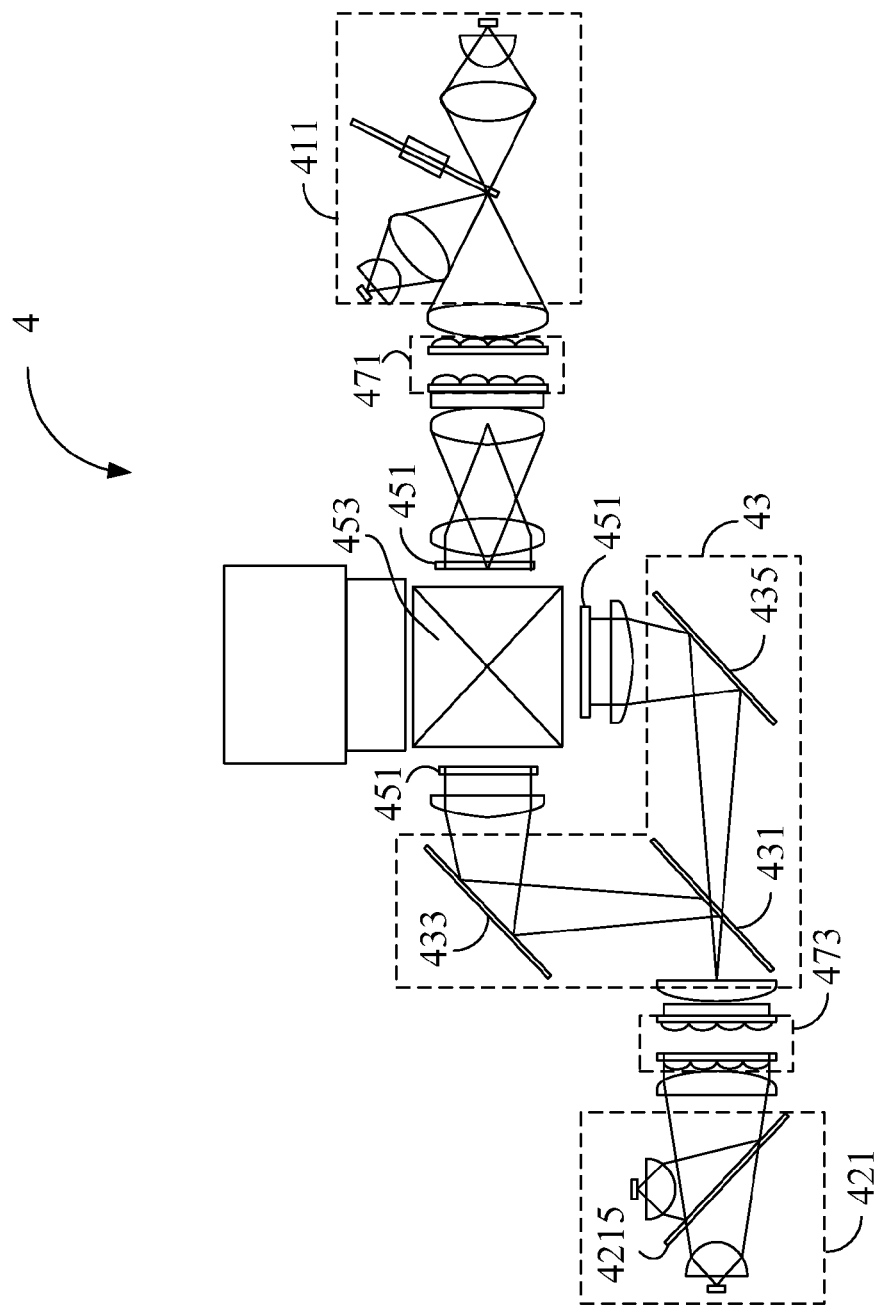
FIG. 4A is a schematic view of a display system in accordance with a second embodiment of this invention.
Figure 4B:
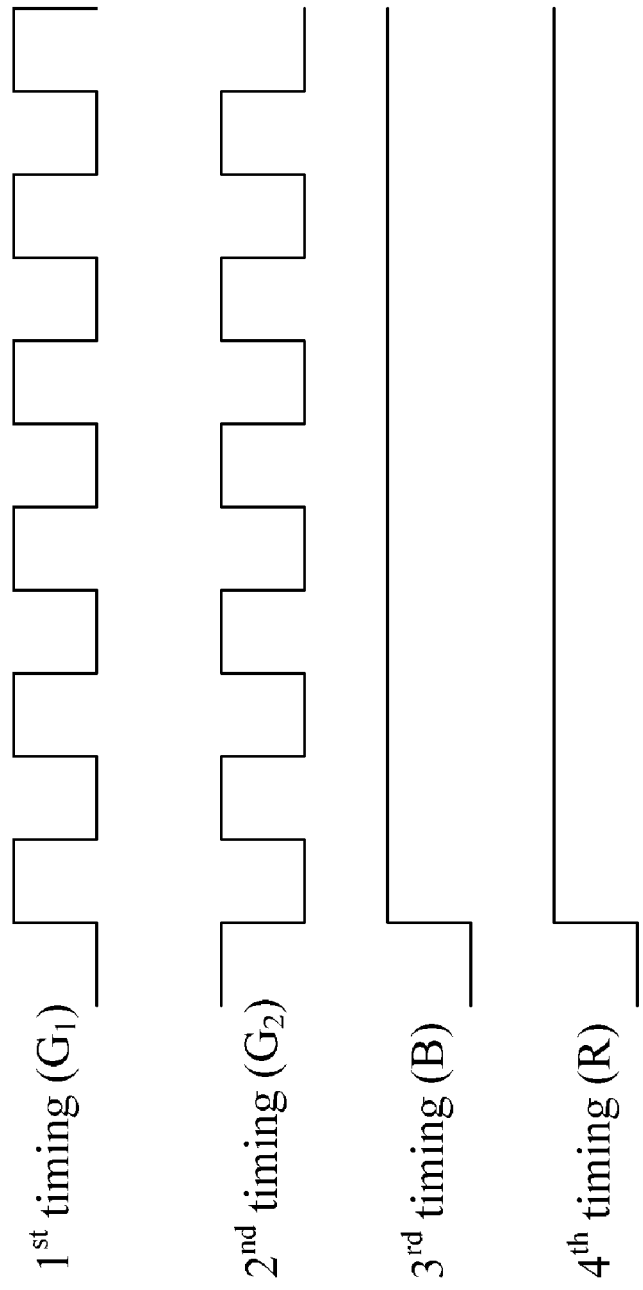
FIG. 4B is an emission timing diagram for the structure of FIG. 4A.

A display system 4 in accordance with the second embodiment of this invention is depicted in FIG. 4. The display system 4, which is a LCD projector in this embodiment, comprises a light source system, a light guiding system 43, and an imaging system. As depicted in FIG. 4A, the display system 4 is generally similar to the display system 3 (see FIG. 3A), with the main difference lying in the arrangement and setup of the optical elements. In addition, as depicted in FIG. 4B, the integrated timing applied in the display system 4 is completely different from that in the display system 3.

In the second embodiment, the light source system with a first light source module 411 and a second light source module 421 comprised therein is the same as the first embodiment, except for the arranged location of the light source modules and the timing of the second light source module 421. In accordance with a predetermined integrated timing comprising a first, a second, a third, and a fourth timings as shown in FIG. 4B, the LEDs in the first light source module 411 and the second light source module 421 emit light beams of the first color (green light beam) and the plurality of different colors (blue and red light beams). The light beams of the first color are then processed by a first lens array assembly 471 into beams of uniform luminance for projecting directly to the imaging system, while the light beams of the plurality of colors are processed by a second lens array assembly 473 into beams of uniform luminance for projecting into the light guiding system 43.

The light guiding system 43 comprises a beam splitter 431 and two mirrors 433, 435. The beam splitter 431 is adapted to separate blue and red light beams, emitted from the second light source module 421 and combined through the light coupling elements 4215. The separated blue and red light beams are then directed by adjacent mirrors 433, 435 respectively for projection to the imaging system. In this embodiment, the beam splitters and the aforesaid light coupling element 4215 of the second light source module 421 may also be an X-plate, a dichroic mirror, a prism or a color filter. The imaging system is adapted to image the green, red, and blue light beams. In this embodiment, the imaging system comprises three liquid crystal devices 451 and an x-cube 453, with the three liquid crystal devices 451 being configured to process the green light beam emitted from the first light source module 411 and the red and blue light beams separated through the beam splitter 431 and guided by the mirrors 433 and 435, respectively. Finally, the x-cube 453 combines the green, red, and blue light beams into an imaging beam for projecting onto the screen.

In the embodiments described above, additional light collective elements may be optionally provided in the display system between the light source system and the light guiding system, between the light guiding system and the imaging system, or within the light source system. Other optical elements may also be added to modify the light path, thereby reducing the size of the display system.

According to this invention, LEDs are lit at particular timings intermittently so that they can endure higher current and therefore deliver higher luminance. In these embodiments, the intermittent lighting mode endows the two LEDs of the first light source module with higher efficiency. Additionally, the converged green light beam can substantially reduce the projection area of the beam on the mirror wheel, thereby shortening the transition time compared to the large projection area on the mirror wheel in the prior art. Therefore, a display device utilizing this invention can display with optimal luminance efficiency.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A digital light processing system, comprising:
    a light source system, comprising a first light source module and a second light source module, the first light source module comprising:
        a mirror wheel, including:
            a central rotating shaft;
            a body, configured at an outer edge of the central rotating shaft, the body having an inner portion and an outer portion, the outer portion is formed at an outer edge of the inner portion, wherein the outer portion comprises at least one reflective segment and at least one transparent segment, and the at least one reflective segment and the at least one transparent segment are alternately arranged along the outer edge of the inner portion; and
        at least two light source submodules, disposed at two opposite sides of the mirror wheel, each of the light source submodules comprising a light emitting diode (LED) and at least one light collecting element, wherein the at least one light collecting element is adapted to converge a light beam projected from the LED to one of the at least one reflective segment and the at least one transparent segment;
    a light guiding system for guiding the light beams provided by the light source system; and
    an imaging system for imaging the guided light beams, wherein the at least two light source submodules of the first light source module are configured to provide a first color light beam according to a first timing and a second timing, the second light source module is configured to provide a second color light beam and a third color light beam which are different from the first color light beam according to a third timing and a fourth timing, and the first color light beam, the second color light beam and the third color light beam with different colors are lighted up according to a predetermined integrated timing, which are interleaved by the first timing, the second timing, the third timing, and the fourth timing, to enter the light guiding system.

2. The digital light processing system of claim 1, wherein the first color light beam is a green light beam, the second color light beam and the third color light beam provided by the second light source module are a blue light beam and a red light beam.

3. The digital light processing system of claim 1, wherein the second light source modules further comprises a light coupling element for directing the light beams to the light guiding system.

4. The digital light processing system of claim 1, wherein the light guiding system comprises an X-plate.

5. The digital light processing system of claim 1, wherein the light guiding system comprises a prism.

6. The digital light processing system of claim 1, wherein the LEDs of the at least two submodules emit light beams having a same color.

7. The digital light processing system of claim 1, wherein the body of the mirror wheel has a disc shape.

8. The digital light processing system of claim 1, wherein the outer portion comprises a plurality of reflective segments and a plurality of transparent segments, and the reflective segments and the transparent segments are alternately disposed along the outer edge of the inner portion.

9. The digital light processing system of claim 8, wherein the reflective segments are spaced apart with one another along the outer edge of the inner portion, so as to form a hollowing segment between each of the two adjacent reflective segments and the hollowing segments are adapted to define the transparent segments.

10. The digital light processing system of claim 8, comprising two light source submodules, disposed symmetrically about the mirror wheel, wherein each of the light source submodules comprises an LED and a light collecting element which converges the light beam emitted from the LED for projecting to one of each of the reflective segments and each of the transparent segments.

11. The digital light processing system of claim 8, wherein:
the at least two light source modules comprises a first light source submodule and a second light source submodule, disposed symmetrically about the minor wheel, the first light source submodule includes a first LED and a first light collecting element, the first light collecting element converges the light beam emitted from the first LED for projecting to the reflective segments according to the first timing, the second light source submodule includes a second LED and a second light collecting element, the second light collecting element converges the light beam emitted from the second LED for projecting to the transparent segments according to the second timing, and
the first timing and the second timing are configured to provide input voltages in an alternating pulse format.

12. The digital light processing system of claim 11, further comprising a controller, electrically connected to the two light source submodules, for controlling the input voltages of the first timing and the second timing.

13. The digital light processing system of any one of claims 1, 6-12 wherein the light collecting element comprises a lens.

* * * * *